United States Patent [19]

Gallizia

[11] 4,266,750
[45] May 12, 1981

[54] DEVICE FOR MANUFACTURING BOOTS AND THE LIKE OF ELASTOMERIC MATERIAL

[75] Inventor: Achille Gallizia, Milan, Italy

[73] Assignee: Industrie Pirelli S.p.A., Milan, Italy

[21] Appl. No.: 76,756

[22] Filed: Sep. 18, 1979

[30] Foreign Application Priority Data

Sep. 21, 1978 [IT] Italy .............................. 27908 A/78

[51] Int. Cl.³ .......................... B29C 1/12; B29D 3/02
[52] U.S. Cl. .................................. 249/65; 12/135 R; 12/136 R; 249/83; 249/160; 249/185; 425/119; 425/129 S; 425/417; 425/442; 425/DIG. 14; 425/DIG. 44; 425/DIG. 58; 425/DIG. 112; 425/470
[58] Field of Search ............................. 264/314, 244; 425/129 S, 119, DIG. 14, 417, DIG. 44, DIG. 58, 438, 442, 470; 12/135 R, 136 R; 249/65, 122, 123, 127, 152, 160, 183, 185, 142, 150, 175, 83

[56] References Cited

U.S. PATENT DOCUMENTS

| 2,907,074 | 10/1959 | Rhodes | 264/244 |
| 3,113,830 | 12/1963 | Boccoli | 264/244 |
| 3,302,244 | 2/1967 | Ludwig | 264/244 |
| 3,324,220 | 6/1967 | Goy | 264/244 |
| 3,454,992 | 7/1969 | Santelmann | 425/129 S |
| 3,458,611 | 7/1969 | Roberts | 264/314 |

Primary Examiner—W. E. Hoag
Attorney, Agent, or Firm—Stevens, Davis, Miller & Mosher

[57] ABSTRACT

A mold for molding a boot or similar footwear from an elastomeric composition and simultaneously lining the footwear with a fabric, has first and second shells each having a cavity which complements the cavity of the other to form a large cavity which corresponds to the upstanding sides of the footwear and a third shell which has a cavity corresponding to the sole thereof. The three shells are assembled together with a rigid core member enclosed therein which defines the inside of the boot. The core member has an elastically expandable casing. Conduits are arranged in the core member for conveying a fluid under pressure to expand the casing.

5 Claims, 3 Drawing Figures

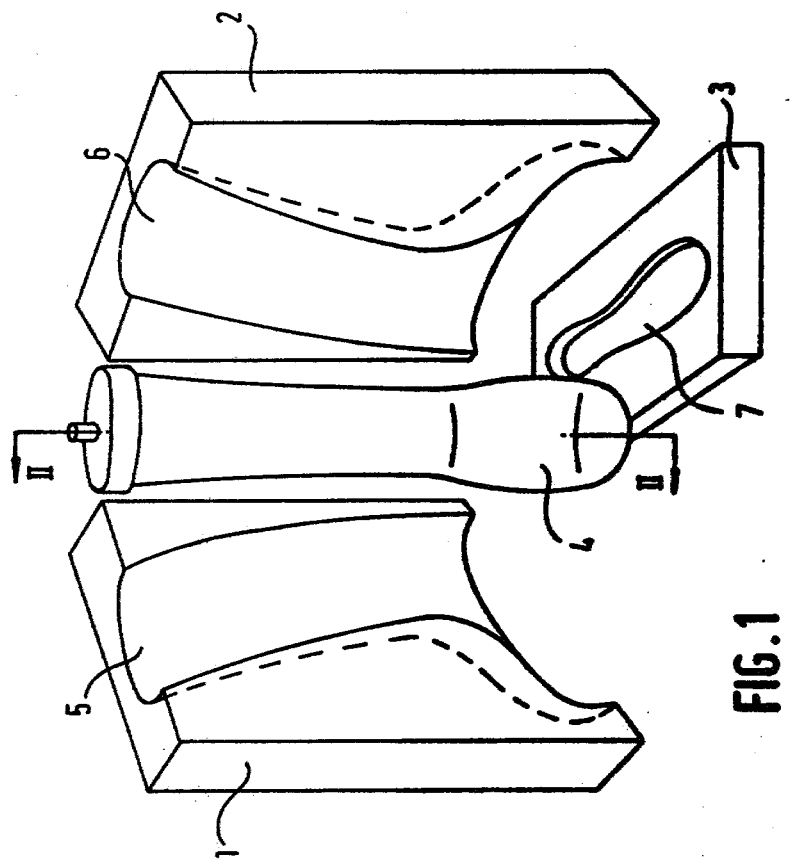

DEVICE FOR MANUFACTURING BOOTS AND THE LIKE OF ELASTOMERIC MATERIAL

This invention relates to a device for manufacturing boots and the like of elastomeric material, with the inner surface of the boot being provided with a lining of textile material.

Devices for manufacturing boots and other footwear by molding an elastomeric material and covering the inner surface with a layer or lining of textile material such as a knitted fabric or stockinette are known.

In the known devices used for manufacturing footwear from elastomeric materials, a lining of "knit" fabric is applied to the inner surface by means of an expandable and collapsable core member onto which the material is fitted like a stocking. On being expanded, the dimensions of the core member are increased, thus the textile material stocking in the boot is enlarged and made to adhere to the inner surface of the uncured elastomer.

The elastomer of the boot is vulcanized while maintaining the textile material stocking adhered to the inner surface of the uncured boot. Once the vulcanization of the elastomeric material has been terminated, the boot is removed from its mold, and the expandable core is collapsed and removed from the boot.

In the "known" devices for manufacturing boots that are provided with a lining of textile material, the expandable and collapsable core has an expandable shell made of a uniform thickness of elastomeric material, which has the form of the internal profile of the boot but of a smaller dimension.

The already known devices for manufacturing boots of this type have the disadvantage of producing a rather unreliable product and a large number of rejects.

These rejected products are caused by imperfect adhesion between the lining fabric and the elastomeric material. This "imperfect adhesion" occurs at diverse points of the boot, but where such a problem will appear cannot be predicted.

It is an object of the present invention to provide a device for molding a boot, shoe or the like from an elastomer and for lining the inner surface of the molded footwear with a textile fabric. Another object is to provide a device for molding boots, shoes and similar footwear which consistently produces an acceptable product with a minimum number of rejects.

Other objects will become apparent from the following description with reference to the accompanying drawing wherein FIG. 1 is an exploded perspective view of one embodiment of the mold provided by the invention;

Figure 3:
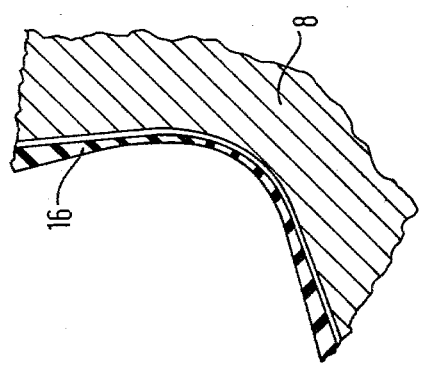
FIG. 3 is an enlarged fragmentary view of a portion of the mold of FIG. 2.

The objects of the invention are accomplished, generally speaking, by providing a device for molding boots and the like out of elastomeric material and for lining the product with a textile fabric, the device comprising a mold formed of an assembly of first and second shells having their concave sides shaped as the external form of one-half of the upper part of the boot and a third shell having its open cavity shaped as the sole of the boot disposed with its axis substantially perpendicular to the longitudinal axis of the first and second shells at the bottom ends of the first and second shells. The device also comprises a core member made in the shape of the boot's interior and disposed within the first, second and third shells. The core member comprises a rigid body on which an elastically expandable and collapsable casing is disposed. The casing, in its collapsed state, lies against the rigid body of the core member which has means adapted for expanding and collapsing the casing on the core member.

Referring now to the drawing, as can be seen in FIG. 1, the device of the present invention adapted for manufacturing a fabric-lined boot by molding an elastomeric composition comprises a mold formed by three connectable and detachable shells 1, 2, and 3, and by a core member 4.

The shell 1 has cavity 5 bounded by an outer surface profile of one-half of the "uppers" of a boot and precisely, that upper-part which lies to one side of the plane perpendicular to the boot sole, and which divides the toe and the heel of the boot, by a through mid-line.

The shell 2 comprises, in its turn, a cavity 6 that has the form of the second half of the upper part of the boot. Shell 3 comprises a cavity 7 shaped in the form of the boot sole.

The assembly of shells 1, 2 and 3, forms a shaped cavity which has the form of the outer surface profile of the boot. A core member 4 shaped like the boot's interior, but of smaller dimensions is enclosed by shells 1, 2 and 3.

Figure 2:
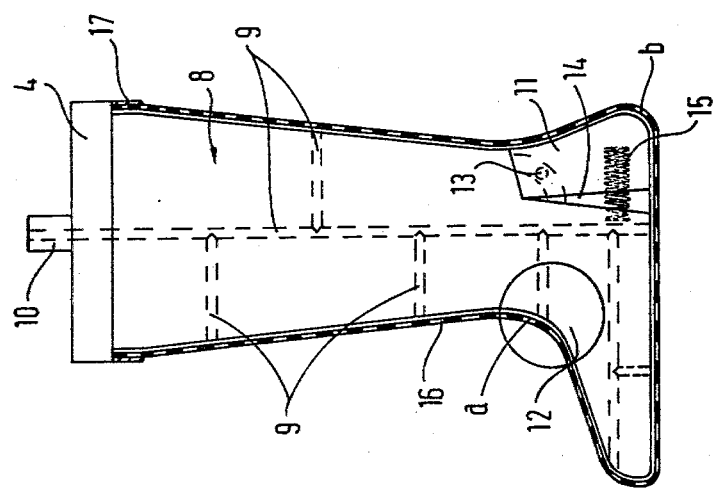
FIG. 2 is a side elevation, partially in section, of the mold of FIG. 1.

Core member 4 is shown in a side elevation with parts in cross-section, in FIG. 2.

As shown in FIG. 2, the core member 4 has a shaped rigid body 8 with a plurality of conduits 9 that branch out from a pipe union 10 and terminate at the surface of the rigid body 8 for conveying a fluid such as air under pressure.

The rigid body 8 is subdivided into two rigid parts 11 and 12. The part 11 of the rigid body 8 is that part which corresponds to the heel of the boot whereas part 12 corresponds to the rest of the rigid body 8. The parts 11 and 12 are "hinged" together at the point 13, and are separated by a hollow-wedge 14 that has its larger dimension in correspondence of the boot arch in the rigid body 8. A spring 15 is disposed between the parts 11 and 12 in such a way that parts 11 and 12 can be moved towards each other by overcoming the resistance of the spring 15.

An elastically expandable and collapsable casing 16 is disposed over body 8 and is fixed to body 8 by means of a clamp 17 (or such other similar element) positioned in correspondence to the part of the rigid body 8 that lies farthest away from the foot.

Casing 16 is, for example, of elastomeric material, and it has a smaller total dimension than that of the rigid body to adapt it to be compressed against the rigid body and thus be preloaded.

The difference in dimensions between the rigid body 8 and the casing 16 will vary somewhat with variations in the physical characteristics of the particular compound of elastomeric material from which casing 16 is made. The compositions from which the casing 16 is made can be selected from any suitable moldable elastomer composition.

The thickness of the expandable and collapsable casing 16 (at least in correspondence of the zones having a greater curvature, and in particular, at least in the zones indicated by the reference letters "a", "b", in FIG. 2) should not be larger than 5 mm, and preferably, not larger than 2.5 mm.

According to one embodiment of the device of the present invention, the thickness of the expandable and collapsable casing 16 is uniform in all the points of the casing and not thicker than about 5 mm.

According to an alternative embodiment (illustrated in FIG. 3), the thickness of the expandable and collapsable casing 16 is not uniform but is still less than 5 mm. The thickness of the casing 16 in the zones of greater curvature is directly proportional to the values of the curvature-radius of the surface of the rigid body 8.

The operation of the device provided by the present invention in molding a boot or the like is as follows with reference being made to the FIGS. 1 and 2.

A sheet of uncured elastomeric material (not shown) is adhered to the surfaces of cavities 5 and 6 of shells 1 and 2 for forming the two halves of the top part or "uppers" of a boot. The sheet of uncured elastomeric material which is to be placed in contact with the surfaces of cavities 5 and 6, is derived from a flat sheet, and particularly, from a flat sheet having a variable thickness depending on the thickness desired for the various zones of the boot. The sheet is pressed against the cavities' surfaces, in such a way as to give it the desired shape; or this can be obtained by injecting the uncured elastomeric material into the mold cavity formed by cavities 5 and 6 around a core similar in shape to core member 4. This core (not shown in the figures) has a shape complementary to the cavities in the shells, but of dimensions such as to create a space between the core member and the surface of the cavities 5 and 6. The space can be filled, for example, by injection or similar process with an uncured elastomeric material.

Cavity 7 is also filled with elastomeric material to form the sole of the boot.

When the above-stated operations have been completed, or, if desired, during these operations, a textile material stocking (and in particular, a stockinette fabric) is fitted onto the core member 4. During this operation of fitting the textile material stocking on the core 4, the elastically deformable casing 16 is in its collapsed state and hence, it adheres to and presses against the rigid body 8 of the core 4. At this point, the shells 1, 2 and 3 are moved together so as to bring the elements of elastomeric material adhering thereto into contact with each other along the shell edges and to press the edges of one against the other, in such a way as to enclose the core member 4 within the shells with the textile material stocking on core member 4.

The expansion of casing 16 now takes place, and for this operation the pipe union 10 is connected to a pressurized gas source such as, for example, pressurized air. The pressurized air passes through the conduit 9, dilates the casing 16 and moves it away from the rigid body 8. With this dilation of the casing 16 and hence, by increasing the dimensions of said casing, there takes place an enlargement of the textile material stocking. This stocking is thus brought into contact with the elastomeric material adhering to the surfaces of the walls of shells 1, 2 and 3, in this way originating an uncured elastomeric boot furnished with an inner lining fabric. The curing of the elastomeric material of the booth is now effected while maintaining casing 16 in the expanded state. Once the curing of the elastomeric material has taken place, casing 16 is collapsed by letting out the pressurized air from said casing. Casing 16 therefore presses once again against rigid body 8. At this point shells 1, 2 and 3 are drawn away from each other and core 4 is removed from the booth. For removing the core member 4 from the boot, forces that are identical but are mutually opposed are exercised. One force is applied to the sole of the boot, whereas the other force is applied to that part of the core 4 which is outermost of the boot itself. Under the action of these contrasting forces, there is first verified (see FIG. 2) a shifting of the portion 11 of the rigid body 8 against the portion 12 of the rigid body by overcoming the resistance of the spring 15. As the two portions 11 and 12 of the rigid body 8 are drawn closer together, the core 4 will be pushed out from inside the boot. Once core 4 is completely removed from the boot, the spring 15 once again draws apart the portions 11 and 12 of the rigid body 8.

The device for manufacturing boots and the like lined with a textile material on their inner surfaces, which has been described above, produces a reliable product, and substantially completely eliminates the production of discards or rejectable boots, since, through this device, a perfect adhesion is obtained at each and every point, between the elastomeric material and the fabric lining the boot.

The reason why the device of the present invention produces such results can be explained as follows.

It is believed that employment of a core member formed by an assembly of a rigid supporting body and an elastomeric expandable-membrane casing (which, in its collapsed state lies against the rigid support, and which is moved away from the latter only at the time when it should carry out the operation of applying the lining fabric), and in combination with the particular critical thickness of the casing membrane makes it possible to effect repeatedly and with constant values, the shifting of the said fabric, during its application to the elastomeric material of the boot.

Besides this fact, the thickness of the expandable casing makes it possible to place simultaneously the entire fabric liner on the inner surface of the boot before fabric is pressed against the said elatomeric material. In this way, distortion in the structure of the fabric is prevented.

Moreover, the employment of an expandable core member in a mold for the molding of the boot, makes it possible to apply of the lining fabric on the inner surface of the boot by enlarging the core casing. This enlargement is always less than that required in the "known" type of casings. As a matter of fact, because of the presence of the rigid support in the expandable core member it becomes possible to center the core member within the mold. Consequently, it is possible to avoid large differences in dimensions between the external surface of the core member and the inner surface of the mold cavity. This, in "known" molds, was not possible because the core member was made entirely of a deformable material, and required a large difference in dimensions between the core member and the mold cavity, in order to prevent any "pinching" taking place in the core member during assembly of the shells that form the outer mold casing.

Moreover, the possibility of effectuating small enlargements in the expandable core carries with it the added advantage of making it possible to apply the lining fabric to the inner surface of the boot with less pressure than usually used with "known" molds. In this way, the lining fabric is subjected to less stretching, and to smaller stresses.

This fact, in its turn, brings about the further advantage that a substantially wider range of fabric may be utilized in lining the boot without requiring a special treatment of the fabric. In particular, any thin-woven fabric can be used without requiring that it be impervious to the elastomeric material, so as to obviate absolutely the drawbacks in the "known" molds, i.e., the migrating of the elastomeric material through pores in the fabric during the vulcanization operation that would result in the presence of residual elastomeric material which would be noticeable on the surface of the inner fabric used on the inner boot cavity.

Furthermore, the use of an expandable casing having a thickness that is directly proportional to the curvature radius of the surface of the elastomeric material on which the lining fabric is applied, also permits variation in the pressure, from one point to another, in the inner boot surface. In this way, it becomes possible to guarantee good adhesion of the fabric in those points where greater stresses are experienced when the boot is worn, and without any risk being taken of the elastomeric material extruding onto the fabric surface that lies in contact with the external surface of the expandable casing.

Although the invention has been described in detail for the purpose of illustration, it is to be understood that such detail is solely for that purpose and that variations can be made by those skilled in the art without departing from the spirit and scope of the invention except as it is limited by the claims.

What is claimed is:

1. An apparatus for molding a boot or the like from an elastomeric composition and simultaneously lining the boot with a fabric on the inner boot surface, said apparatus comprising a mold formed by first and second shells each of which has a cavity shaped as the external form of one-half of the upper part of a boot, a third shell having an open cavity shaped as the sole of the boot and disposed at the bottom end of the first and second shells, and a rigid two-part core member having a shape corresponding to the shape of the interior of the boot, said two parts of the core member being pivotally movable with respect to each other, one of said two parts corresponding to the heel of the boot, and having a pivot near its upper edge, a spring biasing the said two parts apart from each other from a position below said pivot, said parts being spaced apart by a space which is widest near said spring.

2. Apparatus for molding boots or the like from an elastomeric composition and simultaneously lining the boot with a fabric on the inner boot surface, said apparatus comprising a mold formed of a plurality of shells and a core mold, said core mold comprising a rigid body having a variable radius of curvature and an elastically expansible and collapsible casing disposed over said rigid body, characterized in that said casing has a thickness that is directly proportional to the curvature radius of the core member whereby the expansion of said casing is uniform so as to bring all the textile linings in direct contact with the elastomeric material at the same moment and to exert subsequently a pressure that is directly proportional to the curvature radius of the core member.

3. Apparatus of claim 2 wherein the said rigid core member's body comprises two rigid parts which are movable together against the resistance of a spring biasing them apart, one of said parts corresponding to the heel of the core and said parts being the farthest at a point adjacent to the foot-arch of the core member.

4. The apparatus of claim 2 wherein the said elastically expandable and collapsible casing on the core member has a thickness of not more than 5 mm where the core zone has a large curvature.

5. The apparatus of claim 4 wherein the casing has a thickness of not more than 2.5 mm at its points of largest curvature.

* * * * *